Patented June 27, 1950

2,512,669

UNITED STATES PATENT OFFICE 2,512,669

FLOTATION PROCESS

James Birney Morrow, Salt Lake City, Utah, assignor to Koppers Company, Inc., Pittsburgh, Pa., a corporation of Delaware No Drawing. Application August 4, 1948,
Serial No. 42,541

4 Claims. (Cl. 209—167)

This invention relates to ore flotation. More particularly the invention relates to the flotation of iron constituents in an ore by the activation of the iron with an alkali thiocyanate.

Some ores contain many metallic values and most of these metals may be present in sufficient quantity to justify the separation of the metals from the gangue. As an example, an arsenopyrite ore has been treated whose average metal contents by weight per ton of the ore are: lead 3%, zinc 3.36%, iron 10.5%, silver 4.12 oz. and gold 0.13 oz. In the flotation separation of this ore, the lead and silver are floated off in the first cell, the zinc is floated off in the second cell, and the gold is closely associated with arsenopyrite and pyrite so that it is preferred to float the gold with the iron in a third cell.

In an ore of this kind, the iron and gold are usually floated with cresylic acid and Barrett No. 4 as frothers (0.05 lb. per ton of ore of each reagent), 0.3 lb. per ton of ore of Z-6 (potassium Pentasol amyl xanthate) as collector, 1.9 lbs. per ton of ore of copper sulfate as activator, and 1.65 lbs. per ton of ore of sodium carbonate for alkalinity control. I have found that ammonium thiocyanate is very effective as an iron activator, whereas it has heretofore been considered as a depressor. When using about half a pound of ammonium thiocyanate per ton of ore with 0.3 pound of Z-6 per ton of ore, the iron and gold may be effectively floated from the gangue and leave a comparatively small amount of values in the gangue. The ammonium thiocyanate activator in this combination costs about ⅖ths of the cost of the combination in which sodium carbonate and copper sulfate are used as activators.

The primary object of the present invention is to provide an iron activator for ore flotation.

Another object of the invention is to provide an activator for iron when associated with gold so that the iron may be economically floated with the gold.

With these and other objects in view the invention consists in the iron activator for ore flotation as hereinafter described and particularly defined in the claims.

The present invention will be illustrated more particularly with reference to the treatment of the arsenopyrite ore described above. The ore is ground in a ball mill in combination with zinc sulfate (1.0 pound per ton of ore), sodium cyanide (0.3 lb. per ton of ore), lime (1.5 lbs. per ton of ore), and Minerec 27 dixanthogen (0.028 pound per ton of ore). The lime corrects the pH of the material, the Minerec acts as a silver collector, and the zinc sulfate and sodium cyanide act as depressors for the zinc in the ore.

To the pulp from the ball mill is added cresylic acid (0.05 pound per ton of ore) and Barrett No. 4 (0.05 pound per ton of ore) as frothers and Z-3 (0.025 pound per ton of ore) as a collector for the lead and silver. After the lead and silver have been floated from the pulp, the lead tails are conditioned for 10 minutes with lime (4.1 lbs. per ton of ore), copper sulfate (1.3 lbs. per ton of ore) and B-140 (0.045 lb. per ton of ore). Lime is added as an iron depressant, copper sulfate as a zinc activator, and B-140 as zinc collector and frother. The zinc tails are then conditioned with cresylic acid (0.05 lb. per ton) and Barrett No. 4 (0.05 pound per ton) as frother, ammonium thiocyanate (0.5 lb. per ton of ore) as the iron activator, and Z-6 (0.3 lb. per ton of ore of potassium Pentasol amyl xanthate) as the collector. This mixture of compounds will effectively float the iron and gold and leave a comparatively low metal value assay in the final tailings.

The ammonium thiocyanate has been found to be very effective in the treatment of ores containing a substantial amount of iron, particularly when the iron is present as an arsenopyrite or a pyrite. In place of ammonium thiocyanate may be used other alkali thiocyanates. The amount of thiocyanate which may be used for effectively activating the iron and to float the gold with the iron may vary from 0.25 to 1 pound per ton of ore. In most cases, however, it is found that half a pound of the thiocyanates per ton of ore is very effective in activating the iron.

The preferred form of the invention having been thus described, what is claimed as new is:

1. In the concentration of sulfide ores containing metals such as lead, silver, zinc, iron and gold, comprising floating off zinc concentrates, and treating the zinc tails with a potassium amyl xanthate type collecting agent and an alkali thiocyanate activator for iron, agitating and aerating the pulp to float off iron concentrate with any gold.

2. In the concentration of sulfide ores containing metals such as lead, silver, zinc, iron, gold and the like with gangue wherein a lead-silver and zinc concentrates have been separated, the recovery of the gold and iron values comprising: agitating and aerating a pulp of the ore in the presence of potassium amyl xanthate type collecting agent and an alkali thiocyanate activator for iron to float off iron with valuable metal.

3. The method defined in claim 2 in which the activator is ammonium thiocyanate.

4. The method defined in claim 2 in which the iron and gold values are floated with approximately 0.3 pound of potassium amyl xanthate per ton of ore and 0.5 lb. of ammonium thiocyanate per ton of ore.

JAMES BIRNEY MORROW.

REFERENCES CITED

The following references are of record in the file of this patent:

UNITED STATES PATENTS

| Number | Name | Date |
|---|---|---|
| 1,552,937 | McArthur | Sept. 8, 1925 |
| 1,950,537 | Barthelemy | May 13, 1934 |
| 1,970,808 | MacDonald | Aug. 21, 1934 |
| 2,430,778 | Moyer | Nov. 11, 1947 |